United States Patent
Scholz

(10) Patent No.: US 6,618,008 B1
(45) Date of Patent: Sep. 9, 2003

(54) MONOPULSE PHASED ARRAY SYSTEM

(75) Inventor: John Arthur Scholz, Den Haag (NL)

(73) Assignee: Nederlandse Organisatie voor toegepast-natuurwetenschappelijk Pnderzoek TNO, Delft (NL)

(*) Notice: Subject to any disclaimer, the term of this patent is extended or adjusted under 35 U.S.C. 154(b) by 0 days.

(21) Appl. No.: 09/913,757

(22) PCT Filed: Feb. 25, 2000

(86) PCT No.: PCT/NL00/00049
§ 371 (c)(1),
(2), (4) Date: Feb. 4, 2002

(87) PCT Pub. No.: WO00/49423
PCT Pub. Date: Aug. 24, 2000

(30) Foreign Application Priority Data

Feb. 18, 1999 (NL) .............................................. 1011333

(51) Int. Cl.[7] .................................................. G01S 5/02
(52) U.S. Cl. ......................................... 342/427; 342/80
(58) Field of Search ........................... 342/80, 149, 427

(56) References Cited

U.S. PATENT DOCUMENTS 5,173,702 A    12/1992    Young et al.

OTHER PUBLICATIONS

Wilden et al., "The Crow's Nest Antenna—Experimental Results," International Radar Conference, Arlington, Virginia, May 7–10, 1990, Institute of Electrical and Electronics Engineers, pp. 280–285, (XP000131191) (1990).

*Primary Examiner*—Dao Phan
(74) *Attorney, Agent, or Firm*—Leydig, Voit & Mayer, Ltd.

(57) ABSTRACT

A monopulse phased array system comprises antenna elements with T/R modules controlled a beam steering computer. The space in which the antenna elements are arranged is divided into quadrants which are defined relative to the main axis of the radar beam. From the signals received by means of separate antenna elements, sum signals and first and second angle difference signals are derived: After combination of these signals delivered by the T/R modules, control signals are obtained for resteering the radar beam generated under the control of the computer mentioned. Each of the T/R modules is provided with two 180° phase shifters for determining the angle difference signals. After rotation of the radar beam, in the T/R modules of the antenna elements which are located in sectors whose sign of the axis direction perpendicular to the axis direction of the radar beam has changed through the rotation, a phase rotation of 180° is effected in the first angle difference signal and/or in the second angle difference signal.

3 Claims, 3 Drawing Sheets

MONOPULSE PHASED ARRAY SYSTEM

FIELD OF THE INVENTION

The present invention relates to a monopulse phased array system, in particular for a volumetric array antenna whose antenna elements are spatially arranged in three dimensions and which is commonly referred to as crow's nest antenna (CNA). In a special embodiment, the antenna elements are arranged according to a three-dimensional surface, in which case the antenna is designated as 'conformal array' antenna. However, the invention can also be utilized in known linear or planar phased array systems.

BACKGROUND OF THE INVENTION

More concretely, the invention relates to a monopulse phased array system comprising a number of antenna elements, each of which is connected to a T/R (transmitter/receiver) module, which is under the control of a beam steering computer (BSC), to which T/R module a transmitting signal is fed for forming a transmitting beam, and from which, upon reception of reflected signals, a sum signal, a first angle difference signal, in particular an elevation difference signal, and a second difference signal, in particular an azimuth difference signal, are taken, in which phased array system, further, for each of the three signals received via one antenna element, at least one combination unit is present to derive therefrom a total sum signal ($\Sigma$), a total first angle difference signal ($\Delta E$) and a total second angle difference signal ($\Delta A$), from which last-mentioned signals regulation signals ($\Delta E/\Sigma$) and ($\Delta A/\Sigma$) for resteering the transmitting beam generated under the control of the beam steering computer can be obtained. Such a monopuls phased array system is known from U.S. Pat. No. 5,173,702.

In general, tracking a target with a monopulse tracking device requires the simultaneous generation of two types of receiving patterns which are used for determining the angular position of the target relative to the main axis of the monopulse tracking beam. The first receiving pattern is a sum pattern ($\Sigma$-pattern), which consists of one single main lobe and a number of much weaker side lobes. The main lobe of the sum pattern points in the direction of the target from which the reflected signals originate and is used to normalize angle information obtained with the aid of the second receiving pattern. The second receiving pattern is a difference pattern ($\Delta E$ or $\Delta A$ pattern), which consists of two nominally equal-strength main lobes, and a number of much weaker side lobes. The axis of the sum pattern and that of the difference patterns are identical; the patterns are directed to the target along the same line. The ratio of the measured signal strength in the difference patterns, that is, the strength of the measured difference signals, to the measured signal strength in the sum signal, that is, the strength of the measured sum signal, is used to determine the angular position of the target. In practice, it is conventional to generate one sum pattern and two difference patterns to enable independent tracking of a target in azimuth and elevation.

To be able to apply the monopulse principle in a CNA, as described in H. Wilden c.s., The crow's nest antenna-experimental results, IEEE International Radar Conference, Arlington, May 7, 1990, p.280–285, it is known to divide the space in which the antenna elements are arranged into eight sectors (octants). The signals received in the respective sectors, when added together, yield the sum signal ($\Sigma$). At the same time, different combinations of selected sectors are used to derive three difference signals, which are related to the internal coordinate system of the CNA: for instance, the difference of the signals received in four upper and four lower octants, in four left and four right octants, and in four front and four rear octants. These difference signals are further processed to derive from them an elevation difference signal ($\Delta E$) and an azimuth difference signal ($\Delta A$) for resteering the emitted beam to a target.

Various disadvantages are inherent to this known elaboration and application of the monopulse principle. A complicated monopulse RF hardware is present to obtain the three different signals for the CNA coordinate system. Extra signal processing means must be present to derive from these difference signals the elevation and azimuth difference signal. Placing the antenna elements in CNA configuration, which in itself is already complicated due to the large number of antenna elements, is rendered more difficult by the necessity of defining within the system fixed octants that are independent of each other as much as possible, i.e., that the signals received within them influence each other as little as possible. Further, an imbalance arises between the two difference patterns, which imbalance is greater according as a target is located at a relatively greater angle with respect to the octant boundaries, that is, at a greater angle with respect to the internal coordinate axes of the CNA, so that the accuracy with which a target can be tracked by means of the monopulse device diminishes.

BRIEF SUMMARY OF THE INVENTION

The object of the invention is to provide a monopulse phased array system in which the above-mentioned disadvantages are at least substantially avoided.

To achieve this object, the monopulse phased array system such as it is described in the preamble is characterized in that the space in which the antenna elements are arranged is divided into quadrants which are defined relative to the main axis of the transmitting beam, while the axes defined for determining the first and second angle difference signal are directed perpendicularly to the main axis of the transmitting beam; that each of the T/R modules, both for determining the first angle difference signal and for determining the second angle difference signal, is provided with a 180° phase shifter; and that when the transmitting beam after rotation has been directed to a target, in the T/R modules of the antenna elements which are located in sectors whose sign of the axis direction perpendicular to the axis direction of the transmitting beam has changed through the rotation, a phase shift of 180° is effected in the first and/or in the second angle difference signal. This feature basically means that the regulation curve of the monopulse tracking system becomes dependent on the direction of the transmitting beam.

What is achieved through these measures is that the illumination of the two virtual halves on opposite sides of the plane through the axis of the main beam and the respective axis perpendicular thereto yields difference patterns that are virtually completely in balance with each other. Further, the first and second angle difference signal are obtained without conversion of a fixed division into octants to target coordinates. Complicated and relatively expensive monopulse RF hardware is redundant; instead, for each T/R module, a signal inversion corresponding to a 180° phase shift can suffice. More freedom in the spatial arrangement of the antenna elements is obtained. Moreover, the monopulse phased array system is now no longer limited to tracking a target in azimuth and elevation: the target can also be tracked at different angles. Thus, a specific tracking direction and hence a specific difference pattern can be oriented along the track of the target, and tracking the target in the respective direction perpendicular thereto affords the possibility of determining the transverse component of the target velocity, which, along with the Doppler shift in the reflected signal, yields all of the components of the target velocity. As a result, the accuracy and the run-in time of target tracking filters in a radar processor will be improved.

In the monopulse phased array system according to the invention, it is sufficient that for each of the three signals received via one antenna element, only one combination unit is present. In it, all signals are added up in the proper phase, that is, shifted 180° in phase or not. To enable this, each of the T/R modules is provided with switching means for feeding the first and/or the second angle difference signal, shifted 180° or not, to the combination unit in question.

BRIEF DESCRIPTION OF THE DRAWINGS

The invention will now be further explained on the basis of the accompanying drawing, wherein.

DETAILED DESCRIPTION OF THE DRAWINGS

Figure 1:
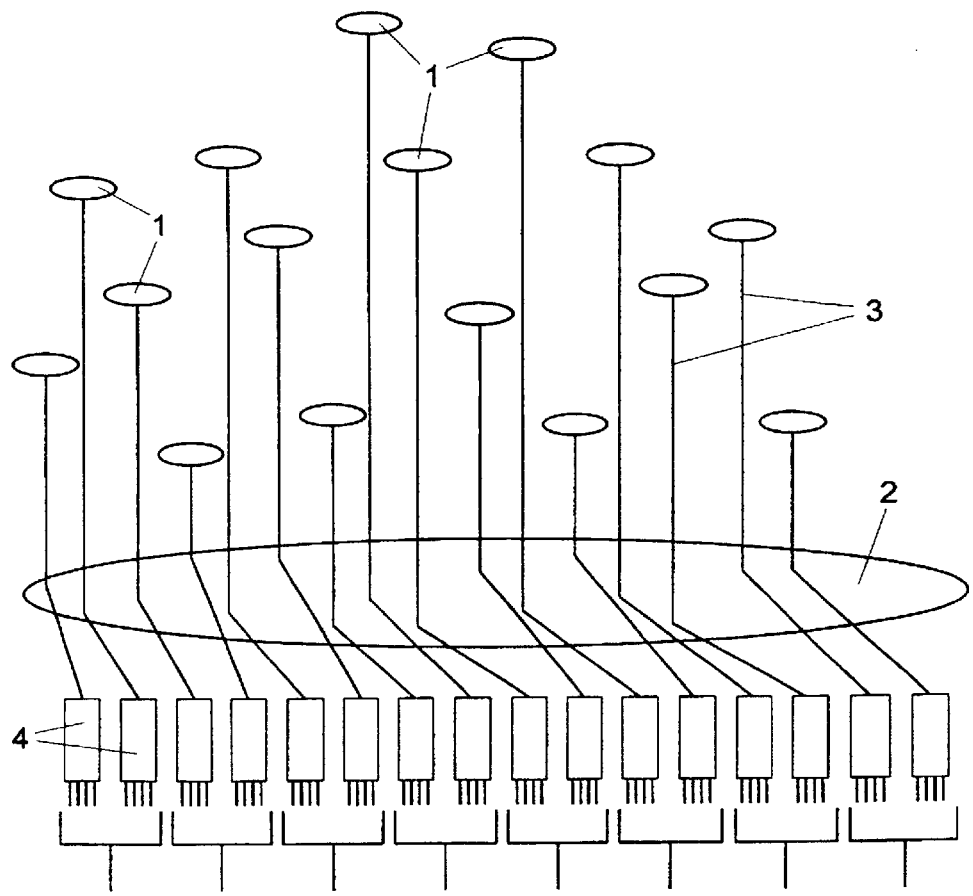
FIG. 1 schematically shows an arrangement of antenna elements and the manner in which the T/R modules are combined according to the prior art.
Figure 2:
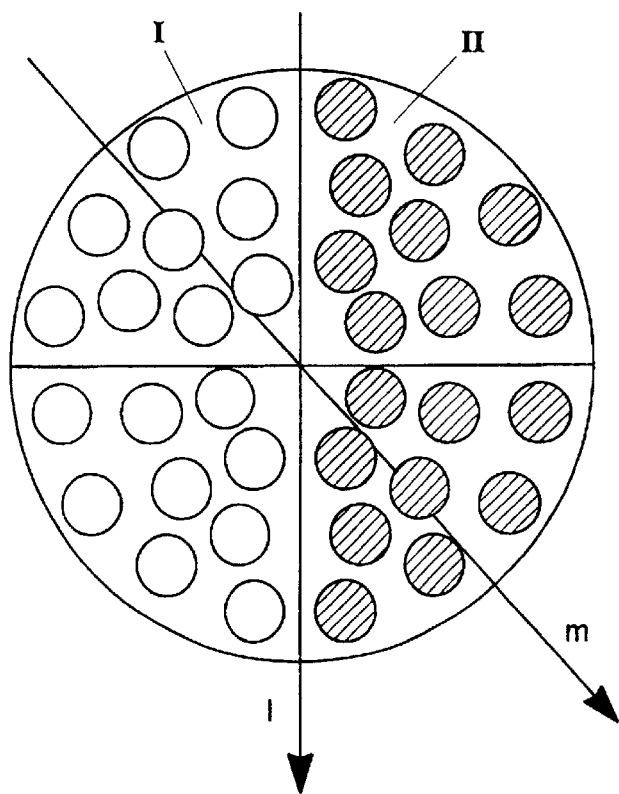
FIG. 2 shows a diagram on the basis of which the imbalance in the difference patterns in a monopulse phased array system according to the prior art will be explained.
Figure 3:
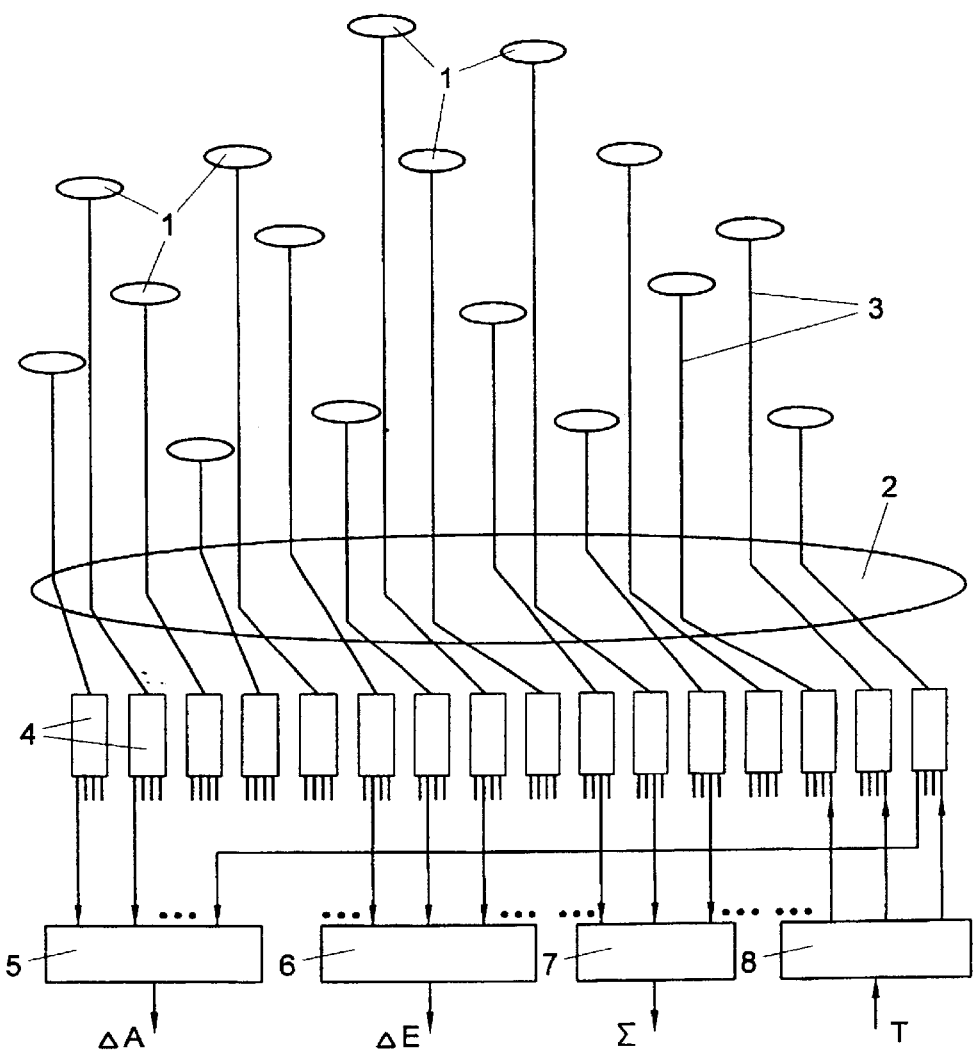
FIG. 3 schematically shows an arrangement of antenna elements and the manner in which the T/R modules are combined according to the invention.

In FIGS. 1 and 3, only a limited number of spatially positioned antenna elements 1 are represented. In practice, this number will be much greater, for instance 4096. These antenna elements 1 are arranged above a base 2. The support of the antenna elements is here formed by coax connections 3 suitable for the conduction of 3.3 GHz waves in this exemplary embodiment. Through these coax connections, each antenna element 1 is connected to a TIR module 4. To be able to track a target with such a system, use is made of the monopulse principle. In FIG. 1, to that effect, the space in which the antenna elements are arranged is divided into eight octants fixedly defined in space. These octants can be represented by spherical sectors obtained by providing in the spatial structure of the antenna elements three virtual planes extending perpendicularly to each other, such that in each spherical segment the same number of antenna elements, for instance 512, are contained. Through a proper phase setting of the RF radiation to be radiated via each separate antenna element, the assembly of antenna elements yields a transmitting beam in a desired direction. To accomplish this, each T/R module comprises in a known manner a phase shifter which is controlled by means of a beam steering computer. When radiation is reflected by a target and this is received by the separate antenna elements, it will be necessary, in order to obtain target position information from this according to the monopulse principle, to derive a sum signal Σ and two angle difference signals, in this exemplary embodiment an azimuth difference signal ΔA and an elevation difference signal ΔE. Deriving a sum signal is done by adding the sum signals Σi delivered by the separate T/R modules. For determining the difference signals mentioned, for each of the virtual planes mentioned, the signals received by antenna elements within four octants located on one side of a virtual plane are to be jointly compared with the signals received by antenna elements within four octants located on the other side of this virtual plane. For the sake of simplicity, the antenna elements located on opposite sides of a vertical virtual plane will be considered; viewed in a flat plane, these antenna elements are represented in FIG. 2.

When it is assumed that the main axis of the received sum and difference patterns extends along the line 1 in FIG. 2, it is sufficient, for deriving a respective difference signal, to ensure that the phase of the signals received by the antenna elements in the half I of FIG. 2 is shifted 180° relative to that in half II. This phase shift can be set a single time through the fixedly defined choice of the octants. When, by contrast, the main axis extends along the line m, both the half under the line m and the half above the line m will contain antenna elements whose received signals have and have not been shifted through 180°. When in that case, further, the antenna elements, for instance above the line m, receive stronger signals than do those under the line m, an asymmetry or imbalance between the two main lobes of the respective monopulse difference pattern will arise, which is furthermore dependent on the direction of the line m, and the monopulse regulation curve, Δ/Σ versus the respective angle coordinate, for a target position on opposite sides of the line will not be equal, and an inaccurate regulation will be obtained. Nonetheless, starting from a fixed division of the space into octants, by combination of, for instance, the four front and the four rear octants, the four left and the four right octants, the four upper and the four lower octants, three difference signals can be obtained. In other words, per octant, signals can be obtained, from which, through three combinations of each time four specifically selected signals with the four other, corresponding signals, three difference signals are obtained. This situation is schematically represented in FIG. 1. Deriving from these the desired ΔA and ΔE difference signals requires applying a coordinate conversion to a coordinate system, of which one of the axes extends along the main axis of the received sum and difference patterns.

Figure 4:
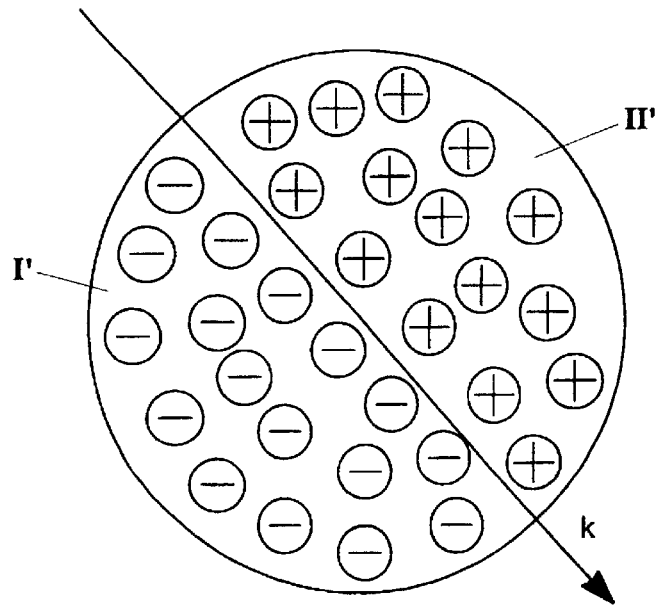
FIG. 4 shows a diagram on the basis of which it will be explained how the imbalance in the difference patterns is prevented in a monopulse phased array system according to the invention.
Figure 5:
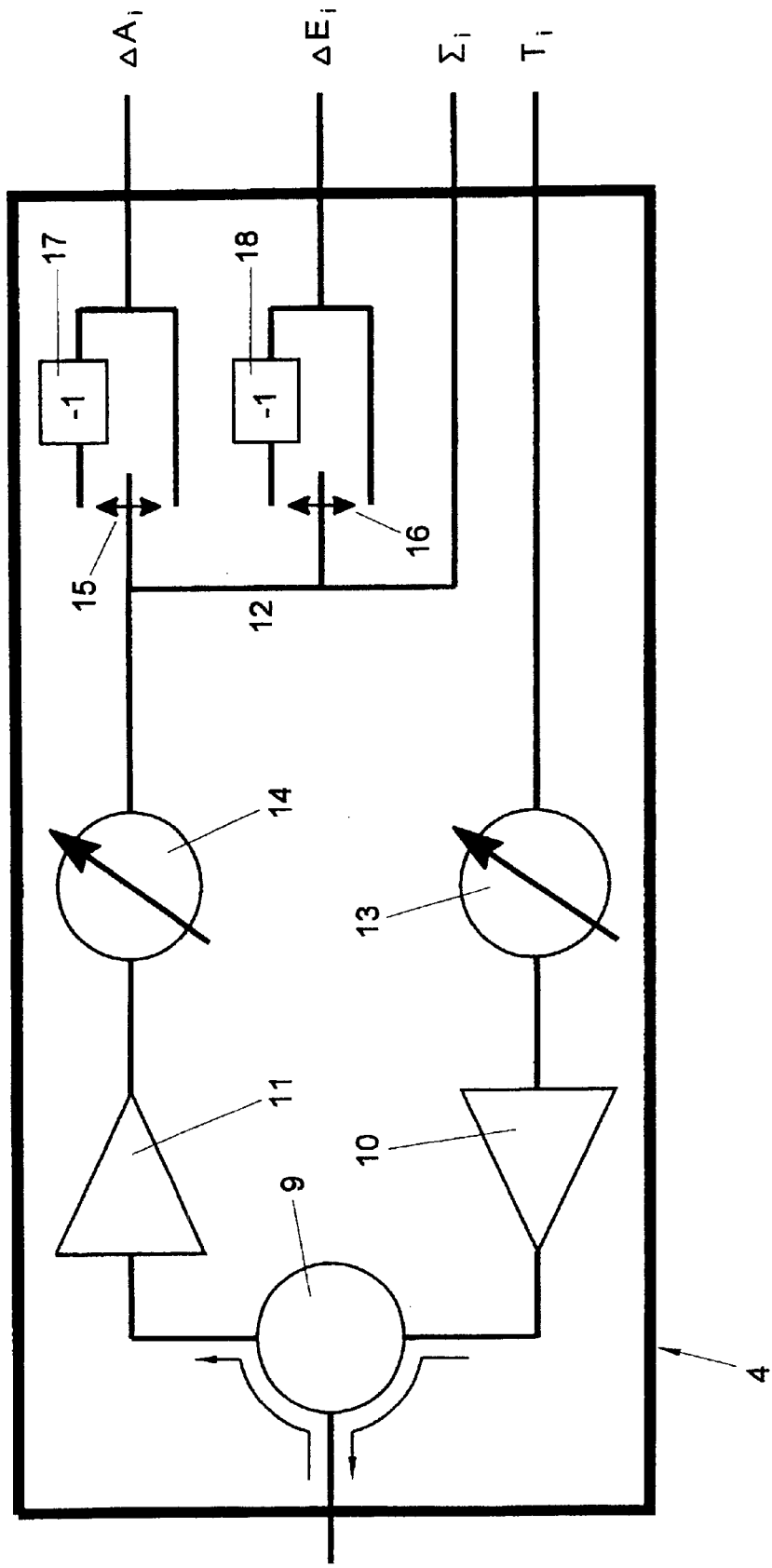
FIG. 5 shows a T/R module according to the invention.

Referring to FIGS. 3–5, presently the monopulse phased array system according to the invention will be explained. Here, the space in which the antenna elements 1 are arranged is divided into four quadrants. These quadrants, however, are not fixedly defined in space here, but are defined with respect to the main axis of the received sum and difference patterns. Since this main axis can each time take a different direction, the quadrants are coupled to a rotary coordinate system. In each position of this coordinate system, it is established which antenna elements are located in which quadrant. This makes it possible to give the signals of the antenna elements on one side of a virtual plane through two of the axes mentioned a phase shift of 180° relative to the signals which are received by antenna elements on the other side of this virtual plane. In other words, in each of the TIR modules connected to the antenna elements, depending on the position of the respective radiation element in one of the quadrants, for the purpose of determining an angle difference signal, an extra phase shift of 180° is introduced or not. In FIG. 4, which has an identical meaning to FIG. 2, this means that the signals received via antenna elements in two quadrants, corresponding to the area I' under the plane perpendicular to the drawing through the line k, undergo a phase shift of 180° with respect to the signals received via antenna elements in the two other quadrants, corresponding to the area II' above the plane perpendicular to the drawing through line k. As a consequence, not only the sum signals $\Sigma i$ but also the difference signals $\Delta Ai$ and $\Delta Ei$ of all separate T/R modules can be directly added to each other, and the sum and difference signals $\Sigma$, and $\Delta A$, $\Delta E$, respectively, result directly therefrom. In other words, for each of the sum and difference signals, only one combination unit 5, and 6, 7, respectively, is present. A similar unit 8 is present to distribute the transmitting signal over the separate T/R modules. Thereupon, from the sum and difference signals $\Sigma$, and $\Delta A$, $\Delta E$, respectively, in a known manner, after down-transformation of the frequency of the signals and after detection and possibly analog-digital conversion, the regulation signals $\Delta A/\Sigma$ and $\Delta E/\Sigma$ can be derived, which signals, fed to the beam steering computer, effect adjustment of the phase shifters 13 and 14 in all T/R modules, such that the transmitting beam is spatially re-steered to the target, so that the target is tracked.

An embodiment of a T/R module is represented in FIG. 5. Such a module comprises-a circulator 9 connected to an antenna element, a power amplifier 10 for the transmitting signal Ti, a low noise amplifier 11 for the received signals, a dividing element 12 to enable the received signal, split into signals $\Sigma$, $\Delta A$ and $\Delta E$, to be fed to the combination units 5, and 6, 7, respectively. For setting the proper phase, phase shifters 13 and 14 are present, to adjust, under the control of a beam steering computer, the desired phase for the signal to be radiated and received by the separate antenna elements. In practice, these phase shifters will often be of mutually integrated design. Further, switches 15 and 16 and phase shifters in the form of inverters 17 and 18 are present to introduce a phase shift of 180° or not in one or both difference signals $\Delta A$ and $\Delta E$. The switches 15 and 16 are also under the control of the beam steering computer. Although in the T/R modules a mixer can be included to transform the frequency of the RF signals already to the medium frequency region, this is applied in practice only to the output signals of the combination units, to prevent losses in the combination units.

The invention is not limited to the exemplary embodiment described here with reference to FIGS. 3–5, but comprises all kinds of modifications thereon, naturally insofar as they fall within the scope of protection of the following claims.

What is claimed is:

1. A monopulse phased array system comprising antenna elements, each of which is connected to a corresponding transmitter/receiver (T/R) module operating under control of a beam steering computer (BSC), wherein each T/R module receives a transmission signal for forming a transmitting beam, and wherein a set of three signals including a sum signal, an azimuth difference signal, and an elevation difference signal, are derivable for each antenna element from reflection signals corresponding to reflections of the transmitting beam, wherein an least one combination unit derives, for each of the set of three signals derivable for each antenna element, a total sum signal, a total elevation angle difference signal and a total azimuth angle difference signal, from which regulation signals for are obtained for resteering the transmitting beam generated under the control of the beam steering computer, and wherein the monopulse phased array system further comprises:

an antenna arrangement space wherein the antenna elements are arranged into quadrants defined relative to a main axis of the transmitting beam, and wherein axes defined for determining the elevation and azimuth angle difference signal are perpendicular to the main axis of the transmitting beam, wherein each of the T/R modules includes a 180° phase shifter, for determining the elevation angle difference signal and for determining the azimuth angle difference signal, and wherein when the transmitting beam after rotation has been directed at a target, the T/R modules are controllable such that, for each antenna element, a phase of shift of 180° is executed in the elevation difference signal and the azimuth angle difference signal in the T/R modules of the antenna elements located in sectors whose sign of the axis direction perpendicular to the axis direction of the transmitting beam has changed through the rotation.

2. A monopulse phased array system according to claim 1, wherein a single combination unit processes reflection signals from antenna elements for each of the three signals derivable for each antenna element.

3. A monopulse phased array system according to claim 2, wherein each of the transmitter/receiver modules is provided with switching means for selectively feeding the elevation angle difference signal and azimuth angle difference signal shifted 180°, to its respective combination unit.

* * * * *